March 29, 1960 W. M. BURNHAM 2,930,448
OIL METERING DEVICE
Filed Oct. 8, 1958 5 Sheets-Sheet 1

INVENTOR
WILLETS M. BURNHAM
BY
ATTORNEYS

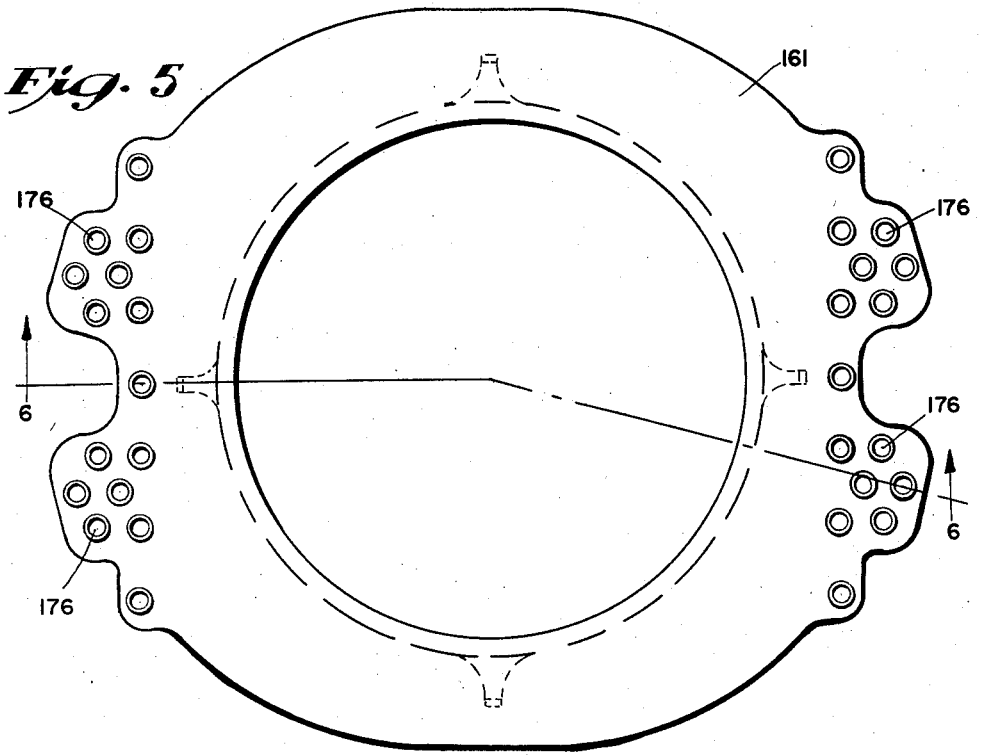
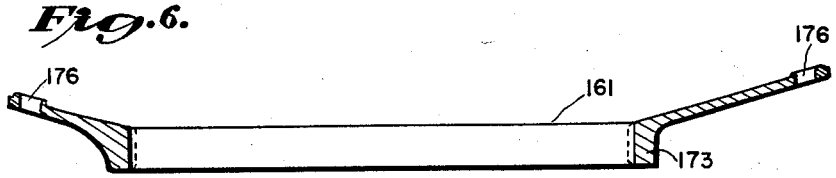

United States Patent Office 2,930,448
Patented Mar. 29, 1960

2,930,448

OIL METERING DEVICE

Willets M. Burnham, Dallas, Tex., assignor to Fort Worth Steel and Machinery Company, Fort Worth, Tex., a corporation of Texas Application October 8, 1958, Serial No. 766,026

15 Claims. (Cl. 184—11)

This invention pertains to a splash-type lubricating system for power transmitting devices comprising meshing gears mounted within a housing. More specifically, it pertains to the lubrication of certain moving parts mounted within a housing wherein a predetermined amount of lubricant is conveyed to the desired points. The present application is a continuation-in-part of my copending application, Serial No. 559,631, filed January 17, 1956, now abandoned.

In the past, a serious problem in the splash lubrication of power transmitting devices, as described above, has been the conveying of sufficient lubricant to the bearings for the gear carrying shafts, and especially is this so where one of the shafts is vertically mounted. The splash-type lubricating system is defective in that lubricating fluid, after it has been picked up by one of the meshing gears, is discharged therefrom in a radial direction due to centrifugal forces and away from the axes of bearings of the gear carrying shafts. Under these circumstances, an insufficient lubrication of the shaft bearings results.

In addition to the problem of conveying sufficient lubricant to gear carrying, vertically mounted shafts, a more serious problem has been the prevention of leakage of the lubricating fluid through the fluid seal around such shafts, irrespective of the type of lubricating system employed, since such seals deteriorate after a certain amount of service. This leakage, in some industries, has caused material being handled by the machinery to become contaminated and damaged by contact with the leaking lubricant. To solve these and other problems, it is a principal object of the present invention to provide means within the gear housing which will not only assure a flow of lubricant to the vertical shaft bearings but will also prevent any lubricant from leaking down through deteriorate seals on such shafts. More specifically, it is intended to provide means for conveying a sufficient amount of lubricant to such bearings, and means for draining the lubricant, so conveyed, from the bearing at a faster rate than it is conveyed thereto with a retaining wall or dam surrounding the shaft underneath the bearing and over which no lubricant will flow because of the faster rate of discharge.

It is another object of my invention to provide means for accurately determining the amount of lubricant which normally inaccessible points within an operating mechanism will receive. This means comprises a collecting pan or trough which is mounted on an inner side wall of the gear housing and extends therein. Any number of these troughs may be used and their size and shape varied so that each point being lubricated may receive a different amount of lubricant from that of any other point.

Still another object of the present invention is to provide a self-contained lubricating system disposed in the gear housing, which system includes a main reservoir and an auxiliary reservoir communicating therewith for effecting a continuous flow of sufficient lubricant.

An additional object of the present invention is to design the interior of the gear housing in such a manner that optimum lubrication of all sliding surfaces will occur without resorting to the employment of an independent pump means for circulating the lubricant.

A further object consists in providing lubricating means in the casing above the bevel gear for collecting oil and feeding the same to the gear assembly and other parts requiring lubrication within the casing.

Another object consists in connecting to the pinion gear within the casing, a flinger which dips into the oil in the main reservoir so as to distribute the same by a flinging action to taper bearing and gear assemblies mounted within the casing.

Other objects and advantages of the present invention will be apparent from a careful consideration of the following detailed description and claims which, in conjunction with the accompanying drawings, will afford a complete disclosure to those skilled in the art of the particular construction and operation of the present invention.

In the drawings:

Fig. 5 is a detailed plan view of the oil pan disclosed in Fig. 4; and

Fig. 6 is a sectional view taken substantially along the line 6—6 of Fig. 5.

Figure 1:
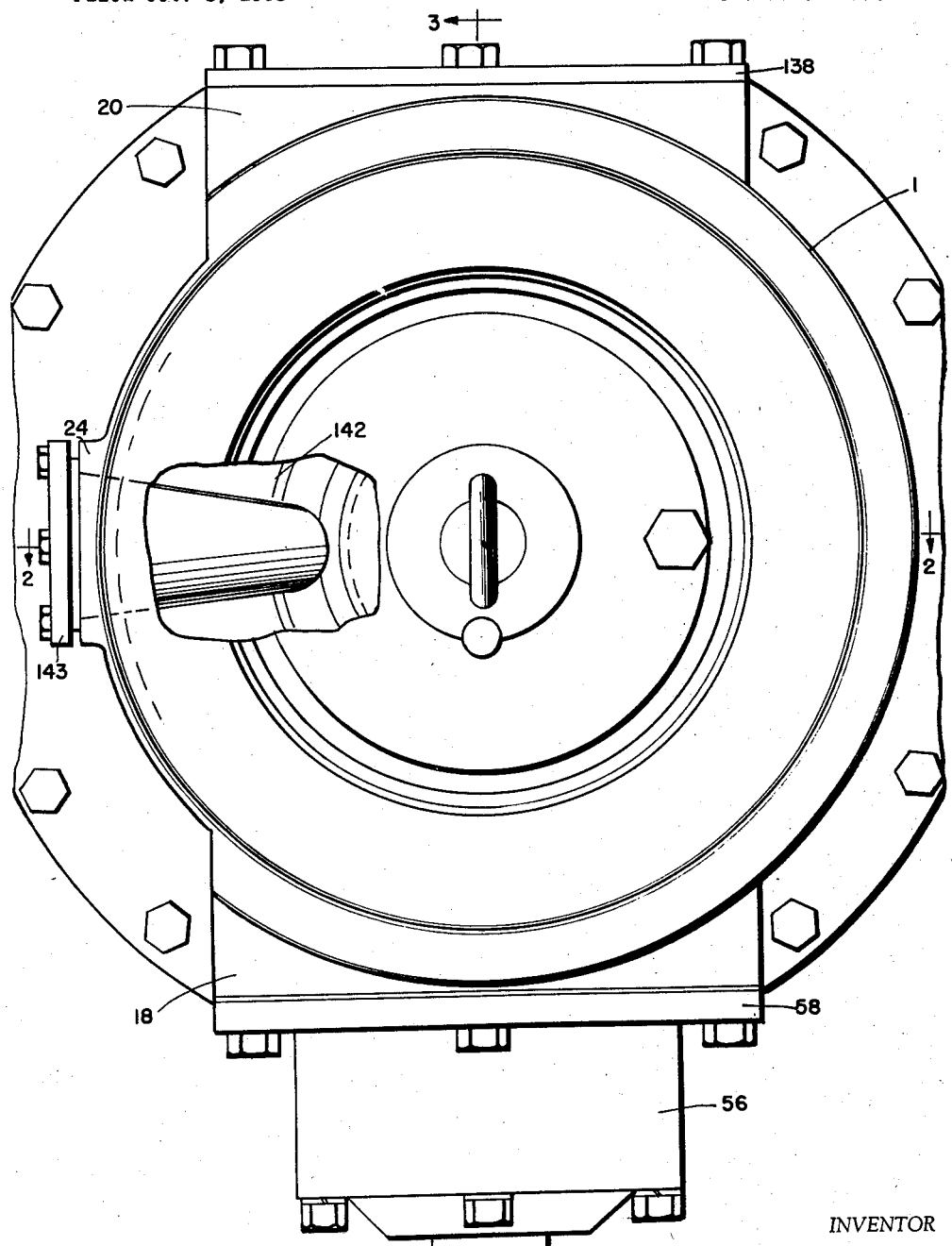
Fig. 1 is a plan view of a gear housing partially cut away, showing the lubricant trough or collecting pan of the present invention.
Figure 2:
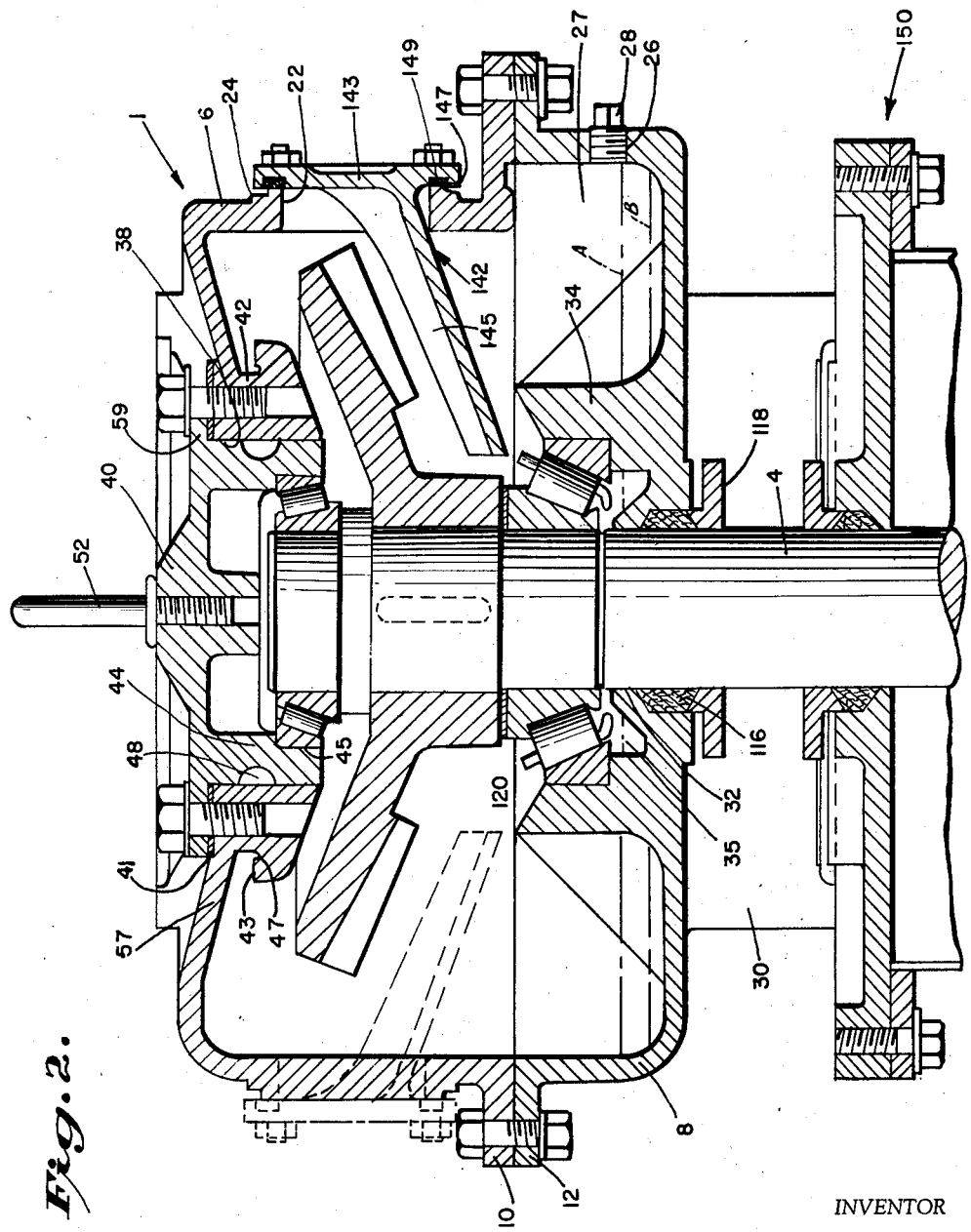
Fig. 2 is a vertical sectional view of the gear housing taken along line 2—2 of Fig. 1.

Referring now to the drawings, the present invention comprises a housing 1, a driving or pinion shaft 2, and a driven shaft 4. The housing 1 is of generally circular shape in plan, as seen in Figure 1, although any shape thereof may be used, such as a square or rectangular shape. As seen in Figure 2, the housing is provided with an upper section 6 and a lower section 8 suitably connected together in fluid-tight relationship through the mating flanges 10, 12 on these sections. Each of these housing sections comprises diametrically opposed openings 14, 16 surrounded by embossments 18, 20. These openings are to be aligned when the housing sections are joined and may serve to receive certain parts. Also, the upper housing section contains at least one other opening 22, of smaller size than openings 14, 16 and spaced therebetween. This last named opening is encircled by an embossment 24.

The lower housing section 8 has a small hole 26 in the side thereof (Figure 2) and a plug 28 is inserted therein. This hole permits the introduction of lubricating fluid into the housing. This lower section of the housing serves as a main or primary reservoir 27 for the lubricant, the level of which is indicated in the dashed and dotted lines A and B of Figures 2 and 3, which lines represent the different lubricant levels between which the system is preferably operated. It will be noted that the lower section has two diametrically opposed, downwardly extending portions 30 in which the openings 16 are formed. These portions are designed to accommodate certain of the parts to be mounted in the housing and to increase the capacity of the main reservoir.

A central hole 32 is formed in the lower housing section, which hole is defined preferably by an upwardly extending, frusto-conical surface 32a and is circumscribed by a radially spaced upstanding collar or annular flange 34 which acts as a support for a bearing on the driven shaft. This collar is integral with the lower section and forms an annular cavity 35 with the surface 32a which constitutes a secondary or auxiliary lubricant reservoir. The collar 34 is provided with a circular recess 37 having a flaring mouth portion 39 while the base of the collar is formed with downwardly sloping, diametrically opposed passageways 36. These passageways establish communication between the secondary reservoir within the collar and the main lubricant reservoir. It will be noted that the higher operating level of lubricant in the main reservoir is below the top of the frusto-conical surface 32a of the secondary reservoir. The purpose for this will be explained hereinafter.

Figure 3:
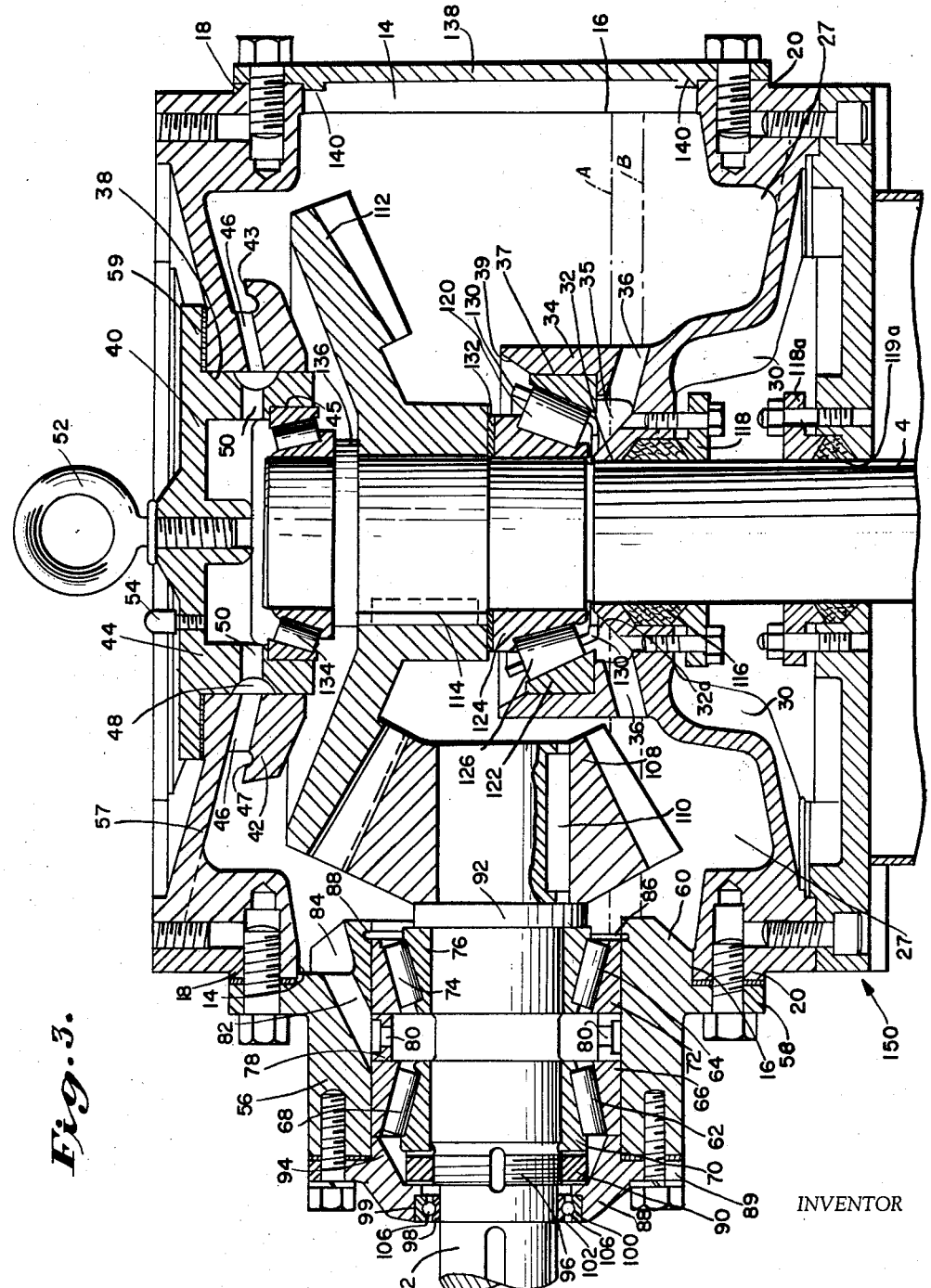
Fig. 3 is a vertical section of the gear housing taken along line 3—3 of Fig. 1.

The upper housing section has a top wall 57 provided with a central hole 38 therein which is adapted to be closed by a cap member 40. This cap member has a rim 59 fastened to the top wall as seen in Figure 2, with a suitable shim or gasket 41 sealing the joint between the cap and top wall. The hole 38 is defined by a depending annulus 42 having a peripheral lip 43 and groove 47 and providing an inner cylindrical surface for engagement with the outer surface of a hollow cylindrical portion 44 of the cap member. This cylindrical portion has an annular recess or counterbore 45. The annulus 42 is formed with radial openings 46 communicating with a circumferential groove 48 and radial passages 50 in the cylindrical portion of the cap (Figure 3). The closure cap may be equipped with a finger-engaging ring 52 to facilitate the handling thereof, and an air vent 54 to relieve any excessive pressures from within the housing.

The gear housing 1 may be mounted on a base 150 containing the parts to be driven and associated with the shaft 4 as seen in Figures 2 and 3.

The driving or pinion shaft 2 is mounted in the housing by means of a tubular member 56 having a flange 58 thereon. This tubular member has a portion 60 projecting to one side of the flange 58 adapted to be inserted in the aligned openings 14, 16 in the upper and lower housing sections as seen in Figure 3 with the radial flange thereon placed against the embossments 18, 20 with a shim or gasket therebetween for attachment of the tubular member to the housing. The pinion shaft is journaled within the tubular member by means of bearings 62 and 64.

Bearing 62 comprises an outer raceway member 66, rollers 68 and inner raceway 70. The outer raceway member has a cylindrical outer surface in close fitting engagement with the bore of the tubular member, and a tapering inner surface adapted to be rotatably contacted by the rollers. The inner raceway member is provided with a bore adapted to embrace the shaft 2 and an outer tapering surface provided with circumferentially-spaced semicylindrical pockets. The rollers are disposed in these pockets for rotation therein.

The bearing member 64 for the pinion shaft comprises an outer raceway member 72, rollers 74, and an inner raceway member 76, all similar to the corresponding parts of bearing 62. It will be noted that the tapering surface of the raceway members for bearing 64 are opposite to those of bearing 62. The purpose of this arrangement is to offer resistance to axial forces or thrust.

A spacer ring 78 is positioned between these bearings and has counterbored apertures 80 therein adapted to communicate with a passageway 82 in the tubular member 56. Passageway 82 rises from aperture 80 to a recessed portion 84 on the inner portion 60 of the tubular member, creating a lubricant flow path from the interior of the housing to the bearings 62, 64, and shaft 2. These bearings are retained in axial position by means of a locking ring 86, a cover plate 88 for the tubular member, a locking nut 90, and a shoulder 92 on the pinion shaft. The ring 86 is disposed in a groove 88' formed in the tubular member, which ring abuts against the outer raceway member of bearing 64 as shown. The cover plate 88 is provided with a flange 89 for connection to the tubular member and has an inwardly projecting, annular portion 94 abutting against the outer raceway member of bearing 62. Threads 96 are formed on the pinion shaft for engagement with the locking nut, the latter being threaded thereon to contact the outer end of the inner raceway of bearing 62. The shoulder 92 on the pinion shaft forms a backing surface for the inner raceway of bearing 64. It should be obvious that with this arrangement, the spacer ring 78 will act to keep the bearings in contact with the retaining surfaces of the members just described and also the shaft and bearings will be prevented from moving in an axial direction.

An oil seal 98 may be provided in a counterbore 99 in the cover plate 88 for rotatably embracing the pinion shaft. This oil seal comprises an outer member 100 and an inner member 102, each having mating annular grooves for the reception of a sealing ring 106. Lubricant flowing through bearing 62 will pass over nut 90 and lubricate the oil seal 98.

Connected to the pinion shaft is a beveled pinion gear 108 which is adapted to dip into the main lubricant reservoir in the depending portion 30 of the lower housing section. Keyways are arranged in the pinion shaft and pinion gear and a key 110 is inserted therein for the transmission of power from the shaft to the pinion gear.

Meshing with the pinion gear is a beveled ring gear 112. This ring gear is also keyed to its shaft 4 by means of suitable keyways and a key 114. This driven shaft is mounted in the hole 32 in the lower housing section and extends upwardly to a point adjacent the cap member 44. A suitable sealing element 116 encompasses the driven shaft below the hole 32 for external sealing only and is held in sealing engagement with the shaft by plate 118. This plate 118 may be connected to the lower housing section by studs, as shown in Figure 3, and to prevent against any leakage of lubricant from the secondary reservoir 35 through the stud holes in the housing, an oil resistant sealing compound may be used on the studs or the stud holes may be blind holes. Another sealing element 119a for the driven shaft is mounted in the base 150 as shown with a plate 118a retaining this latter element in sealing position.

A bearing 120 is associated with the lower part of the driven shaft. This bearing comprises an outer race 122, an inner race 124, rollers 126 and a cage member 130. The outer race is disposed in the recess 37 in the upstanding collar while the inner race embraces the shaft and both races are provided with the usual roller-retaining shoulders. It will be noted that the ring gear is supported by the inner race with a shim 132 therebetween. The upper end of the driven shaft is journalled in the cylindrical portion 44 of the cap member by means of bearing 134. This bearing has the usual outer race, inner race, and tapering rollers, with the inner race resting on an annular shoulder 136 of the driven shaft, while the outer race is disposed in the recess 45 of the cap member. It should be noted that upward axial movement of the driven shaft will be prevented by the cooperation of the shoulder 136 with the bearing 134 and recess 45, while downward axial movement of this shaft will be prevented by the cooperation of said shoulder with the ring gear, bearing 120 and recess 37.

A plate 138 is removably connected to the embossments 18, 20 closing the openings 14, 16 in the housing opposite the pinion shaft 2. This plate comprises a guiding ridge 140 for properly aligning the plate with the openings in the housing sections. When the plate is removed, accessibility to the interior of the housing will be afforded for inspection and maintenance purposes, or another gear may be mounted in the housing at this point to mesh with the ring gear.

As seen in Figure 2, a lubricant distributing member 142 is inserted in the opening 22 in the upper housing section. This member comprises a base portion 143 and a trough portion 145 integral therewith. The base portion has a peripheral groove 147 therein which receives a sealing member 149 adapted to contact the embossment 24 to which the base portion may be removably attached by means of bolts. The trough portion 145 underlies the ring gear and extends to a point superjacent the bearing 120. The purpose of this trough is to collect a certain amount of the lubricant that is splashed against the inner side wall of the housing by centrifugal force from the ring gear and direct the same onto the bearing 120. It is to be understood that since the trough is removably connected to the housing, troughs of various sizes may be interchanged to convey more or less lubricant to bearing 120. Also, the upper housing section may be modified to accommodate any desired number of such troughs (as seen in dotted lines in Figure 2) thereby conveying lubricant to any desired point or points within the housing, while the amount of the lubricant conveyed to these points will be predetermined by the size of each trough used.

In the operation of the lubricating system of the present invention, power is transmitted between the shafts by the rotation of the gears, with pinion gear 108 dipping into the body of the lubricant in the main reservoir a sufficient distance to enable lubricant to be picked up and transferred partially to the teeth of the ring gear and partially to be dispersed from both gears against the walls of the housing by centrifugal force. Some of the lubricant that is picked up will form a protective film or layer on the meshing teeth of the pinion and ring gear. The splashing of the oil against the housing walls will result in a flow of some of the lubricant to the peripheral lip and groove 43, 47 from whence such lubricant will flow through passages 46 to lubricate bearing 134 and also, some of the lubricant will be splashed into the recessed portion 84 to flow through passage 82 to lubricate the bearings 62, 64, and the seal 98. As has already been stated, the trough 145 will collect a certain amount of the lubricant splashed against the side walls of the housing and direct such lubricant over bearing 120. This lubricant will flow through the bearing and into the secondary reservoir 35. Since the amount of lubricant this bearing receives will be dependent upon the size of the trough, the latter is so designed that the rate of feed of lubricant to the bearing 120 will be slower than the rate at which lubricant flows from the secondary reservoir to the main reservoir through the passages 36 thereby preventing lubricant from rising in the secondary reservoir above the frusto-conical surface 32a, which surface acts as a retaining wall or dam. It should, therefore, be apparent to those skilled in the art that since the level of lubricant never rises above the retaining wall 32a no lubricant will contact the shaft 4 between the bearing 120 and the wall 32a and consequently none will flow down the shaft to the sealing element 116 so that irrespective of the condition of the sealing element no lubricant will leak out of the housing down the shaft 4. It should also be obvious that bearing 120 would receive little or no lubricant if the trough 145 were not employed, unless a special pumping arrangement or intricate flow circuit were provided. With the trough positioned in the manner described, a positive flow of lubricant to bearing 120 is assured and the amount of such lubricant can be predetermined by the number and size of the troughs used.

Figure 4:
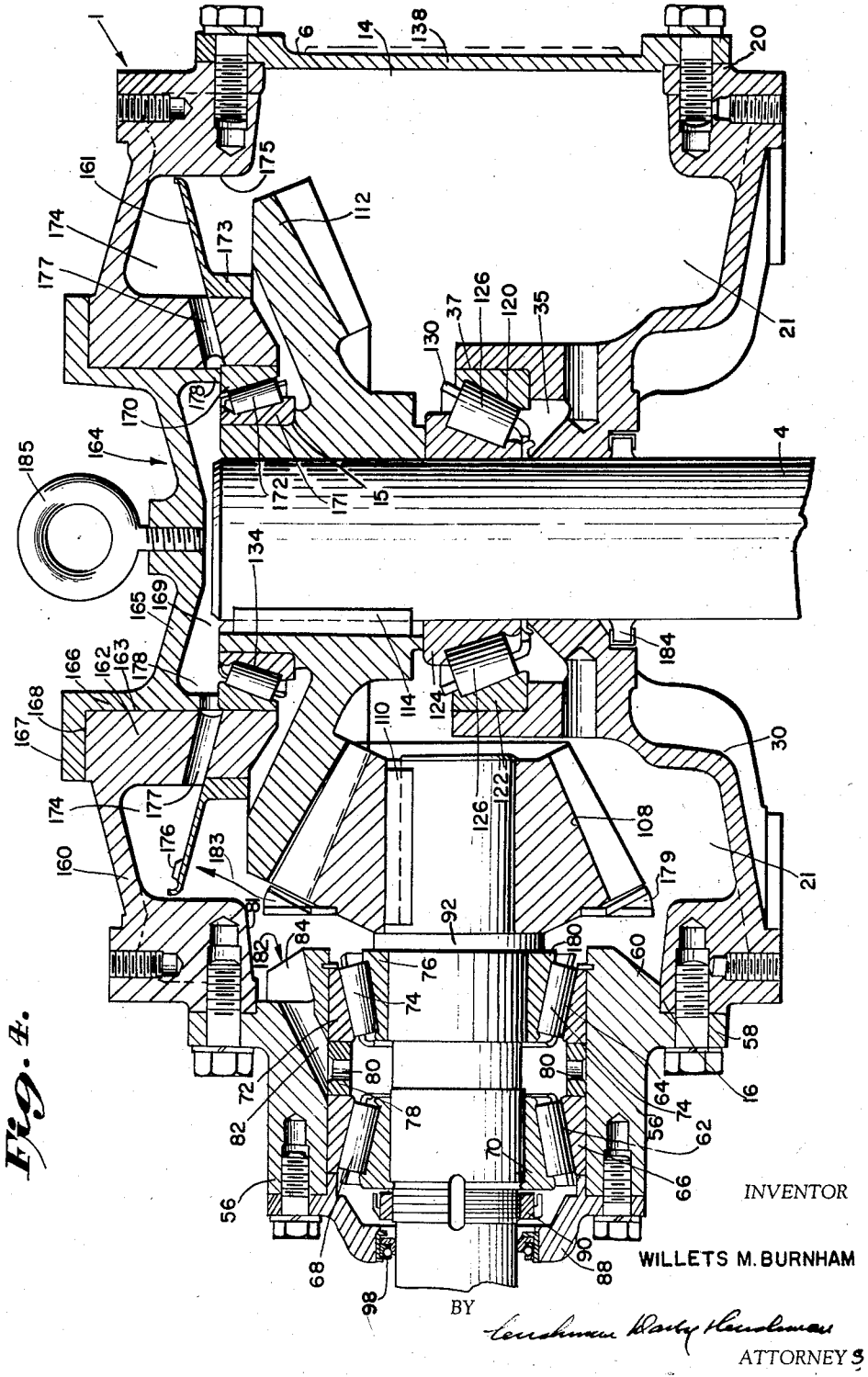
Fig. 4 is a vertical sectional view similar to Fig. 3 of a modified form of the present invention.

In the modified form of the invention shown in Fig. 4, the construction and operation of the pinion gear 108, ring gear 112 and their associated parts, are substantially the same as previously described. However, the removable top wall 160 of the gear housing or casing 1, instead of being shaped as shown by the wall 57 previously described, dispenses with the use of the member 42 and the groove 47, and substitutes therefor, a stationary oil pan 161, preferably shaped as shown in Fig. 5. Additionally, the top wall or closure 160 has a centrally disposed depending tubular portion or boss 162 spaced from the inner side wall thereof and extending a limited distance downwardly into the housing so as to form a centrally disposed opening 163. The opening 163 is closed by a cap or cover 164 that includes an annular body or transverse web 165 formed at the outer periphery with a vertical skirt 166 that terminates in an annular horizontal flange 167 arranged to rest in sealing engagement, as at 168, on the adjacent flat surface of the top wall 160. When the cap 164 is in its closed position, it coacts with the boss 162 to form an oil distributing chamber 169 into which extends the upper end of the driven shaft 4 and the bearing members 134. The bearing members 134 may include the outer race 170, inner race 171 resting on an annular shoulder 15 of the gear 112, and rollers 172.

The oil pan 161 may have a central hub or tubular bearing surface 173 fixed to the outer annular surface of the tubular boss 162 in any suitable manner. The pan 161 is inclined upwardly and extends across an annular recess or auxiliary chamber 174 formed between the tubular portion 162 and the confronting inner wall 175 of the top closure 160. The pan 161 has on opposite sides thereof a plurality of through openings 176, preferably disposed and formed as shown in Fig. 5. The depending tubular portion 162 adjacent and above the fixed inclined pan 161, is formed with circumferentially spaced transverse openings or inclined passages 177 which register with complementary openings 178 in the annular skirt 166 of the cap, when the parts are assembled, so as to establish communication between the oil distributing chamber 169 and the auxiliary chamber 174 in order that oil deflected upwardly in the reservoir 27 by the rotation of the pinion 108 and the flinger 179, will pass through the openings 176 in the inclined pan 161, and be directed through the passages 177 and openings 178 into the chamber 169 and thus insure proper lubrication of the ball bearings 134 as well as the upper end portion of the shaft 4 during the operation of the metering device.

The periphery of the bevelled pinion gear 108 which dips into the main lubricating reservoir 21 and is positioned adjacent the ball bearings 74, is preferably provided with the metal annular flinger 179 secured thereto in any suitable manner, as at 180. Thus, it will be seen that during the operation of the device, the flinger 179 serves to twirl a portion of the oil in the reservoir 27 upwardly against the inner wall 181 so as to deflect the same in the direction of the arrow 182, in order that this portion of the oil may flow downwardly through the recessed portion 84, passageway 82, opening 80, and lubricate the drive shaft 2 as well as the bearings 62 and 64. At the same time, another portion of the oil deflected upwardly by the flinger 179 is thrown in the direction of the arrow 183, so as to pass through the openings 176 and against the inner wall of the top 160, and then is deflected downwardly onto the inclined pan 161 where it is conveyed through the passages 177 and openings 178 into the chamber 169, for the purpose of lubricating the bearing members 134 and their associated parts, as well as the upper portion of the driven shaft 4.

A suitable packing 184 is positioned between the downwardly extending portions 30 and the adjacent portion of the shaft 4 so as to provide sealing means for preventing the escape of oil between these parts. The cap 164 may have a handle 185 for facilitating its insertion into the boss 162 or its removal therefrom.

Thus, it will be seen that efficient lubricating metering means are provided in the power transmission housing for insuring proper lubrication of the gears, bearings, shafts, and other movable parts mounted in the housing 1. Moreover, the metering means is so constructed and arranged that it may be installed at a minimum expenditure of time, effort and cost.

While the present invention has been set forth in considerable detail, it is not intended to limit the invention to such detailed constructions but only as defined by the scope and spirit of the appended claims.

I claim:

1. A power transmitting device comprising a housing having an upper wall, a lower wall and a vertical, enclosing side wall, an opening in the lower wall and an upstanding collar on said lower wall circumscribing said opening, a primary lubricant reservoir surrounding said collar, a shaft disposed in said opening and a bearing therefor mounted in said collar, said lower wall including an upwardly extending annular wall disposed radially inwardly of said collar and the friction surfaces of said bearing, said annular wall coacting with said collar to define a secondary lubricant reservoir communicating with said primary reservoir, means for conveying lubricant from said primary reservoir to said secondary reservoir through said bearing, outlet means from said secondary reservoir establishing communication between said secondary reservoir and said primary reservoir and disposed below the top of said annular wall, a ring gear mounted on said shaft above said bearing, said means for conveying lubricant including a trough secured to said vertical side wall and positioned intermediate said bearing and ring gear terminating at a point superjacent said bearing, and a pinion gear meshing with said ring gear and partially submerged in said reservoir.

2. A power transmitting device comprising a housing having a vertical, enclosing side wall and upper and lower walls projecting inwardly therefrom, with an opening provided in each of the latter walls, said lower wall having upstanding, radially-spaced annular flanges on the interior thereof and circumscribing the opening therein, said housing in the region surrounding the outer of said flanges forming a primary lubricant reservoir, a vertical shaft arranged in said openings in said upper and lower walls, bearings connected to said shaft adjacent said openings, one of said bearings also connected to said outer flange with the friction surfaces of said one bearing being disposed above and radially outwardly of said inner flange; a secondary lubricant reservoir defined by said flanges, the part of said bottom wall between said flanges, said one of said bearings; passageways disposed in said outer flange for providing communication between said reservoirs; a ring gear in said housing and secured to said shaft intermediate said bearings and a trough attached to said vertical side wall of the housing and projecting underneath said ring gear to a point adjacent said one of said bearings.

3. A device as set forth in claim 2 wherein a pinion gear is disposed in said housing meshing with said ring gear and partially submerged in said primary reservoir whereby lubricant is transferred from said primary reservoir to said ring gear upon rotation of said pinion gear and such lubricant is subsequently dispersed in a horizontal spray against said vertical wall where part of it collects in said trough and is directed over said one of said bearings to flow into said secondary reservoir, and wherein said trough and said passageways are so constructed and arranged that lubricant is discharged from said secondary reservoir through said passageways at a faster rate than it is fed to said one bearing from said trough.

4. A power transmitting device comprising a housing having an upper wall, a lower wall and a vertical, enclosing side wall, an opening in the lower wall and a pair of radially spaced upstanding collars on said lower wall circumscribing said opening, a primary lubricant reservoir surrounding the outer of said collars, a vertical shaft disposed in said opening and a bearing therefor mounted in said outer collar with the friction surfaces of said bearing being disposed radially outwardly of the inner of said collars, a secondary lubricant reservoir disposed between said collars, and above said primary reservoir, outlet means from said secondary reservoir establishing communication between said secondary and said primary reservoirs and disposed below the top of the inner of said collars, a ring gear secured to said shaft and resting on said bearing, a pinion gear meshing with said ring gear and partially submerged in said primary reservoir to convey lubricant to said ring gear to be discharged therefrom against said side wall and means on said side wall projecting within said housing for collecting a predetermined amount of the lubricant discharged from said ring gear and directing such lubricant over said bearing.

5. A device as set forth in claim 4 wherein passageways are provided in said collar establishing communication between said reservoirs, whereby the lubricant directed over said bearing will flow first into said secondary reservoir and then through said passageways and back to said primary reservoir.

6. A device as set forth in claim 5 wherein said side wall is provided with an opening therein and said means comprises a trough positioned in said opening, said trough underlying said ring gear and terminating superjacent said bearing, and wherein said trough and said passageways are so constructed and arranged that lubricant is discharged from said secondary reservoir at a faster rate than it flows to said bearing.

7. A power transmitting device comprising a housing having a rotatable shaft mounted vertically therein and extending downwardly therethrough, a bearing for said shaft, said housing including an annular support for said bearing and an upwardly extending wall disposed inwardly of said support and the friction surfaces of said bearing, said wall embracing said shaft beneath said bearing and defining a cavity with said annular support, lubricant in said housing surrounding said annular support, the level of such lubricant being below the upper end of said wall, means for conveying such lubricant to said bearing at a predetermined rate, and said annular support being provided with openings therein for the discharge of lubricant flowing into said cavity from said bearing, at a faster rate than lubricant is conveyed to said bearing to prevent the lubricant flowing into said cavity from rising above said wall.

8. A power transmitting device comprising a housing having a bottom wall provided with an opening therein, said bottom wall having an upwardly extending wall circumscribing said opening, an upstanding collar on said bottom wall radially spaced outwardly from said upwardly extending wall and forming an annular cavity therewith, a primary lubricant reservoir in the bottom of said housing, the level of lubricant in said reservoir being lower than the top of said upwardly extending wall, a rotatable shaft disposed vertically in said opening and extending downwardly therethrough, a bearing surrounding said shaft and mounted in said collar above said upwardly extending wall with the friction surfaces of said bearing being disposed radially outwardly of said latter wall, means for conveying lubricant to said bearing at a predetermined rate, said lubricant so conveyed gravitating into said annular cavity, and said collar being provided with openings establishing communication between said annular cavity and said reservoir for drainage of lubricant from said cavity at a faster rate than it is conveyed to said bearing to prevent the level of oil in said cavity from rising above said upwardly extending wall.

9. A power transmitting device comprising a housing having a lower wall provided with an opening therein, an upstanding annular collar on said lower wall circumscribing said opening, a primary lubricant reservoir surrounding said collar and disposed therebeneath, a rotatable shaft arranged vertically in said opening and extending downwardly therethrough, a bearing for said shaft mounted in said collar, an upwardly extending annular wall on said housing lower wall being disposed radially inwardly of said collar and the friction surfaces of said bearing, a secondary lubricant reservoir subjacent said bearing between said collar and said annular wall, said collar being provided with passageways establishing communication between said reservoirs and means for conveying lubricant to said bearing at a slower rate than the passageways in said collar permit such lubricant to flow from said secondary reservoir to said primary reservoir.

10. A power transmission device including a gear housing having a lubricating reservoir in the bottom thereof, said housing having a top provided with a depending tubular boss spaced from the inner wall thereof so as to provide an auxiliary chamber communicating with said reservoir, a cap for closing said tubular boss, said cap having a skirt extending axially into said boss, a vertical shaft extending into said housing, a gear in said housing and fixed to said shaft, said gear and the end of said shaft being spaced from said cap to form an oil distributing chamber, anti-friction bearings rotatably mounted on said gear, an oil pan extending across said auxiliary chamber and having spaced vertical openings, said boss having at least one transverse passage communicating said auxiliary chamber with said oil distributing chamber above said pan, and rotatable means within said lubricating reservoir and dipping into the reservoir for throwing oil upwardly into said auxiliary chamber and through the openings in said pan so as to conduct the oil through said passage into the distributing chamber in order to lubricate the antifriction bearings and said shaft.

11. A power transmission device including a gear housing having a lubricant reservoir, said gear housing having a vertical shaft therein, a ring gear fixed to said shaft and spaced from the inner wall of the housing to form an oil distributing chamber above said shaft, anti-friction bearings rotatably engaging said ring gear, a pinion gear rotatably mounted in said housing and meshing with said ring gear, said pinion gear having a peripheral flinger dipping into the oil in said reservoir, said housing having an auxiliary chamber communicating with said reservoir and positioned above said pinion gear, an oil pan mounted in said housing and extending across said auxiliary chamber, said pan having spaced openings, means communicating the auxiliary chamber above said pan with said oil distributing chamber, the parts being constructed and arranged so that as the oil in the reservoir is thrown upwardly by said flinger, the oil passes through the openings in said pan and passes through the communicating means to said distributing chamber so as to lubricate the anti-friction bearings and the ring gear shaft during the operation of the device.

12. A power transmission device as called for in claim 11 in which the pinion gear is connected to a horizontal drive shaft, anti-friction bearing rotatably supporting the drive shaft in said housing, and means for transferring a portion of the oil thrown upwardly by the flinger so as to lubricate the drive shaft and the antifriction bearings associated therewith.

13. A power transmission device including a gear housing having a lubricating reservoir in the bottom thereof, said housing having a top provided with a depending tubular boss spaced from the inner wall thereof so as to provide an auxiliary chamber communicating with said reservoir, a cap for closing said tubular boss, said cap having a skirt extending axially into said boss, a vertical driven shaft extending into said housing, a ring gear in said housing and fixed to said driven shaft, said gear and the end of said shaft being spaced from said cap to form an oil distributing chamber, anti-friction bearings rotatably mounted on said ring gear, an upwardly inclined oil pan extending across said auxiliary chamber and having spaced vertical openings, said boss having at least one transverse passage communicating said auxiliary chamber with said oil distributing chamber above said pan, a drive shaft extending horizontally into said housing, a pinion gear in said housing and fixed to said drive shaft, said pinion gear meshing with said ring gear, anti-friction bearings in said housing for rotatably supporting said drive shaft, said housing having passages communicating said last-mentioned bearings with said auxiliary chamber, and said pinion gear having a flinger thereon dipping into the oil in said reservoir so that upon rotation of the pinion gear to throw the oil upwardly so that a portion thereof is conducted into said auxiliary chamber and through the openings in the oil pan so as to pass through the transverse passage in the boss and into the distributing chamber to lubricate the driven shaft and its associated bearings, another portion of the oil thrown upwardly by the flinger being conducted through the passages in said housing to lubricate the drive shaft and its associated bearings.

14. A power transmission device including a gear housing having a lubricant reservoir in the bottom thereof, said gear housing having a drive shaft therein, a pinion gear fixed to said drive shaft, antifriction bearings mounted in said housing and rotatably supporting said drive shaft, a driven shaft in said housing and disposed substantially at right angles to said drive shaft, a ring gear fixed to said driven shaft, anti-friction bearings rotatably engaging said ring gear, a flinger connected to said pinion gear and extending outwardly and radially therefrom so as to dip into the oil in said reservoir, said housing having an annular auxiliary chamber positioned above said ring gear and concentric relative thereto, an upwardly inclined oil pan extending across said auxiliary chamber and provided with spaced openings, said flinger, when the device is in operation, serving to throw a portion of the oil upwardly into said auxiliary chamber and through the openings in said oil pan, means for conducting the oil in said pan to lubricate the driven shaft and its associated anti-friction bearings, and means for deflecting another portion of the oil thrown upwardly by the flinger to lubricate the drive shaft and the anti-friction bearings associated therewith.

15. A power transmission device including a gear housing having a lubricant reservoir therein, said gear housing having a horizontal opening in one side thereof, a drive shaft extending through said opening, a bevel pinion gear in said housing and fixed to said drive shaft, said pinion gear dipping into the oil in said reservoir, said housing having a vertical opening in a side thereof and disposed at substantially right angles to said horizontal opening, a ring gear in said housing and fixed to said driven shaft, said ring gear meshing with said pinion gear, said housing having a top closure provided with a depending annular tubular boss, said boss being spaced from the inner side wall of said housing to provide an auxiliary chamber above said pinion gear, an oil pan fixed to said boss and extending laterally into said auxiliary chamber, said pan having a plurality of spaced openings therein, a cap for closing said tubular boss, said cap being spaced from the inner end of said driven shaft to provide an oil distributing chamber, said boss having spaced transverse passages communicating the auxiliary chamber with the oil chamber, roller bearings mounted between said boss and said ring gear, roller bearings in said housing and engaged with said drive shaft, said pinion gear having an annular flinger dipping into the oil in said reservoir so as to throw a portion of the oil upwardly through the openings in the oil pan and distribute the oil to said distributing chamber so as to lubricate the bearings and end of the driven shaft, and means for conveying another portion of the oil thrown upwardly by the flinger to the bearings for the drive shaft.

References Cited in the file of this patent
UNITED STATES PATENTS

| | | |
|---|---|---|
| 2,015,108 | Harper | Sept. 24, 1935 |
| 2,017,260 | Smith | Oct. 15, 1935 |
| 2,221,189 | Hodge | Nov. 12, 1940 |
| 2,275,895 | Fietinghoff et al. | Mar. 10, 1942 |
| 2,551,980 | Tholl | May 8, 1951 |
| 2,592,633 | Wilson | Apr. 15, 1952 |